United States Patent [19]
Kim

[11] Patent Number: 5,453,856
[45] Date of Patent: Sep. 26, 1995

[54] LIQUID CRYSTAL DISPLAY WITH GATE LINES CONNECTED WITH A DOPED SEMICONDUCTOR LAYER WHERE THEY CROSS DATA LINES

[75] Inventor: Hong K. Kim, Kyungki-do, Rep. of Korea

[73] Assignee: Goldstar Co., Ltd., Seoul, Rep. of Korea

[21] Appl. No.: 164,202

[22] Filed: Dec. 9, 1993

[30] Foreign Application Priority Data

Dec. 10, 1992 [KR] Rep. of Korea .................. 23845/1992

[51] Int. Cl.⁶ .................................................. G02F 1/1343
[52] U.S. Cl. .................................................. 359/54; 359/88
[58] Field of Search .................... 359/58, 54, 88

[56] References Cited

U.S. PATENT DOCUMENTS

| 4,844,588 | 7/1989 | Yamazaki et al. | 350/339 R |
| 5,162,933 | 11/1992 | Kakuda et al. | 359/59 |

FOREIGN PATENT DOCUMENTS

| 0506528 | 9/1992 | European Pat. Off. | 359/54 |
| 63-287825 | 11/1988 | Japan | 359/54 |
| 63-276030 | 11/1988 | Japan | 359/58 |
| 4250426 | 9/1992 | Japan | 359/58 |
| 5-119332 | 5/1993 | Japan | 359/88 |

*Primary Examiner*—Anita Pellman Gross
*Assistant Examiner*—Charles Miller
*Attorney, Agent, or Firm*—John P. White

[57] ABSTRACT

A liquid crystal display which can decrease parasitic capacitance developing at the crossing points of gate bus lines and data bus lines and can improve step coverage of a data bus line at the crossing point, comprising an insulating transparent substrate, a plurality of islandic conductive layers formed at the crossing points of the gate; lines and data lines on the insulating transparent substrate, a plurality of the gate lines formed on the substrate connecting opposing edges in one direction of each conductive layer, and a plurality of the data lines crossing above the conductive layers perpendicular to each gate line, isolated from conduction materials and gate lines.

2 Claims, 7 Drawing Sheets

F I G. 4
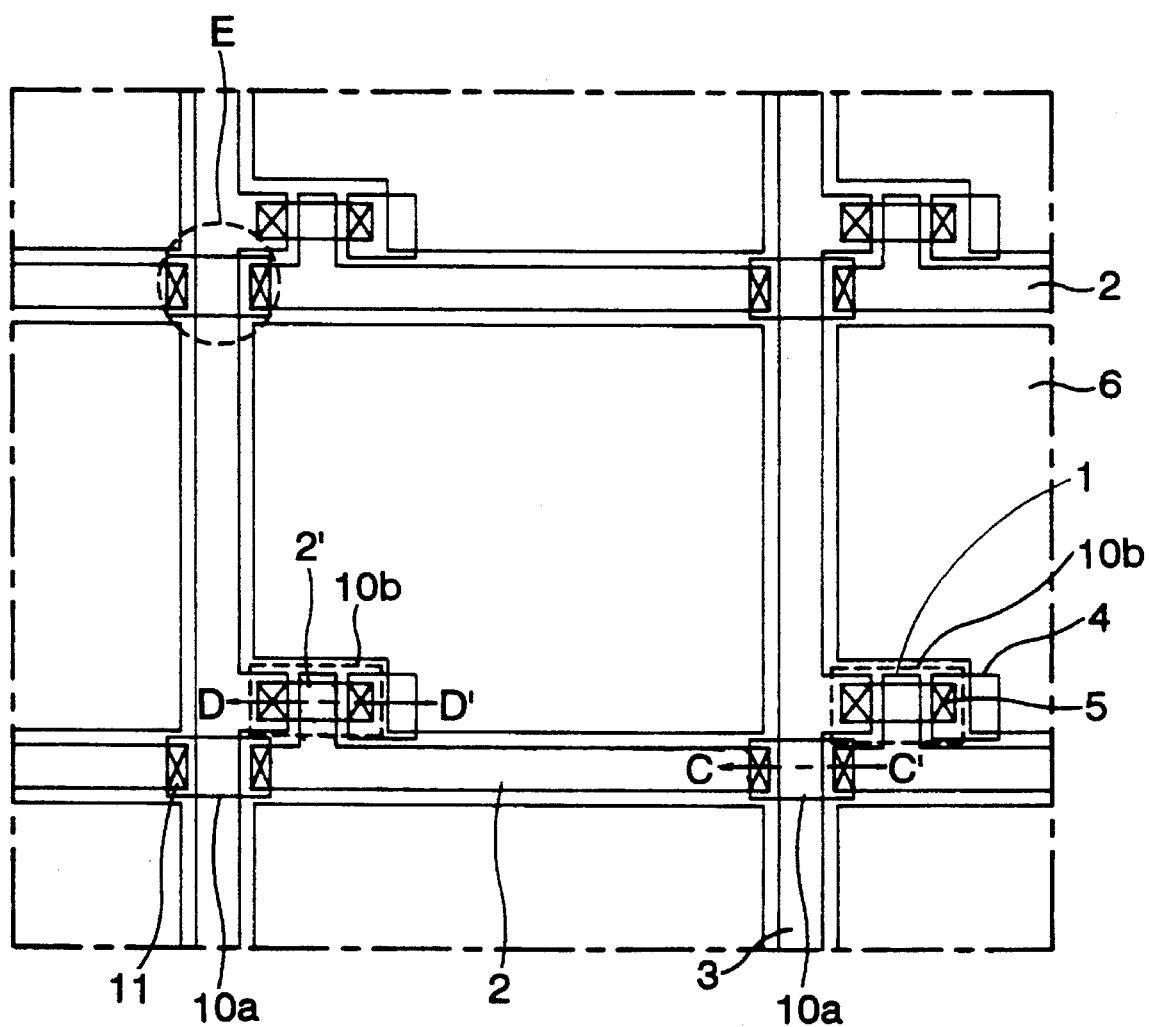

LIQUID CRYSTAL DISPLAY WITH GATE LINES CONNECTED WITH A DOPED SEMICONDUCTOR LAYER WHERE THEY CROSS DATA LINES

FIELD OF THE INVENTION

This invention relates to a liquid crystal display and a method of producing the same, more particularly to the liquid crystal display and the method which can decrease parasitic capacitance developing at the crossing part of a gate bus line and a data bus line, and can improve step coverage of a data bus line at the crossing parts.

BACKGROUND OF THE INVENTION

In general, a liquid crystal display consist of two sheets of glass substrate having liquid crystal being injected between them, which is used to make an image thereon utilizing the alteration of optical property of a liquid crystal cell on changing the array of liquid crystals by application of voltage.

Such liquid crystal display is classified into simple matrix driving method and active matrix driving method. Active matrix driving method in which TFT-LCD(Thin Film Transistor–LCD) is typical, is a driving method that each pixel pole is attached with active element so that each pixel can be driven independently minimizing the influence from the data signal of adjacent pixel, which allows to obtain high contrast ratio and to increase number of scanning lines.

Conventional liquid crystal display is to be explained hereinafter referring to attached drawings.

FIG. 1 is a plan view of a conventional active matrix driving type liquid crystal display, FIG. 2 is a sectional view of A—A' line of FIG. 1, and FIG. 3 is a sectional view of B—B' line of FIG. 1, wherein the conventional liquid crystal display includes gate lines 2(only two lines are shown in FIG. 1) formed in one direction with a certain distance between them, data lines 3 formed rectangular to the gate lines 2, transparent poles 6 formed between each gate lines 2 and each data lines 3 for driving the liquid crystal cells, and thin film transistors formed at the crossing parts of the gate lines 2 and data lines 3 for applying signals to the pixel poles.

The production method of a conventional liquid crystal display described above is as follows.

As shown in FIG. 2 and FIG. 3, deposit a semiconductor layer 1 of polycrystalline silicon or amorphous silicon on an insulating transparent substrate 9 of glass or quartz and form active areas of thin film transistors by means of patterning, leaving only the areas that the thin film transistor is to be formed thereon, then, deposit a gate insulation film 8 and metal are successively on the overall surface, and remove the deposited metal selectively to form the gate electrodes and the gate lines 2, thereafter, wherein the gate lines 2 are formed in plurality with a certain distance as shown in FIG. 1, and the gate electrodes connected to the gate lines are formed on the semiconductor layer 1.

After forming source/drain areas by injecting n+ions into the semiconductor layer using the gate electrodes as mask and deposition of an insulation film 7 on the overall surface, form the transparent poles which are pixel poles and the data lines 3 successively in the pixel areas, and remove the insulation film 7 selectively thereafter to expose above source/drain areas so as to the contact holes 5 to be formed, and deposit metals 3 and 4 and carry out patterning to connect each data lines 3 to the source areas and each transparent pole 6 to the drain areas.

However, in developing high definition, large size display having many pixels, it is found that parasitic capacitance is caused to form at the crossing parts(D in FIG. 1) of the gate lines and the data lines. This parasitic capacitance has been a problem in developing high definition, large size liquid crystal display because this parasitic capacitance acts as a factor of increasing the delay time of the gate signal making the response time slow, and in case the width of the gate lines and the data lines are decreased in order to decrease the parasitic capacitance, the problem still exists because the width can not be decreased without limit due to the increase of line resistance, which will decrease the element characteristics, and due to the difficulties in design and production.

SUMMARY OF THE INVENTION

This invention has been devised to solve aforementioned problems and the object of this invention is to decrease parasitic capacitance between gate lines and data lines while preventing short circuit between step coverage of the data lines and pin holes.

The object of this invention can be achieved by providing a liquid crystal display including an insulating transparent substrate; a plurality of islandic conduction layers formed at the crossing parts of gate lines and data lines on the insulating transparent substrate; a plurality of gate lines formed on the substrate connecting opposing edges in one direction of each conduction layer; and a plurality of data lines crossing above the conduction layer rectangular to each gate lines isolated from each conduction layer and each gate lines.

BRIEF DESCRIPTION OF THE DRAWINGS

FIG. 4 shows a lay-out of a liquid crystal display according to this invention.

DETAILED DESCRIPTION OF THE INVENTION

A liquid crystal display according to this invention described above is to be explained in more detail referring to the accompanying drawings hereinafter.

Figure 1:
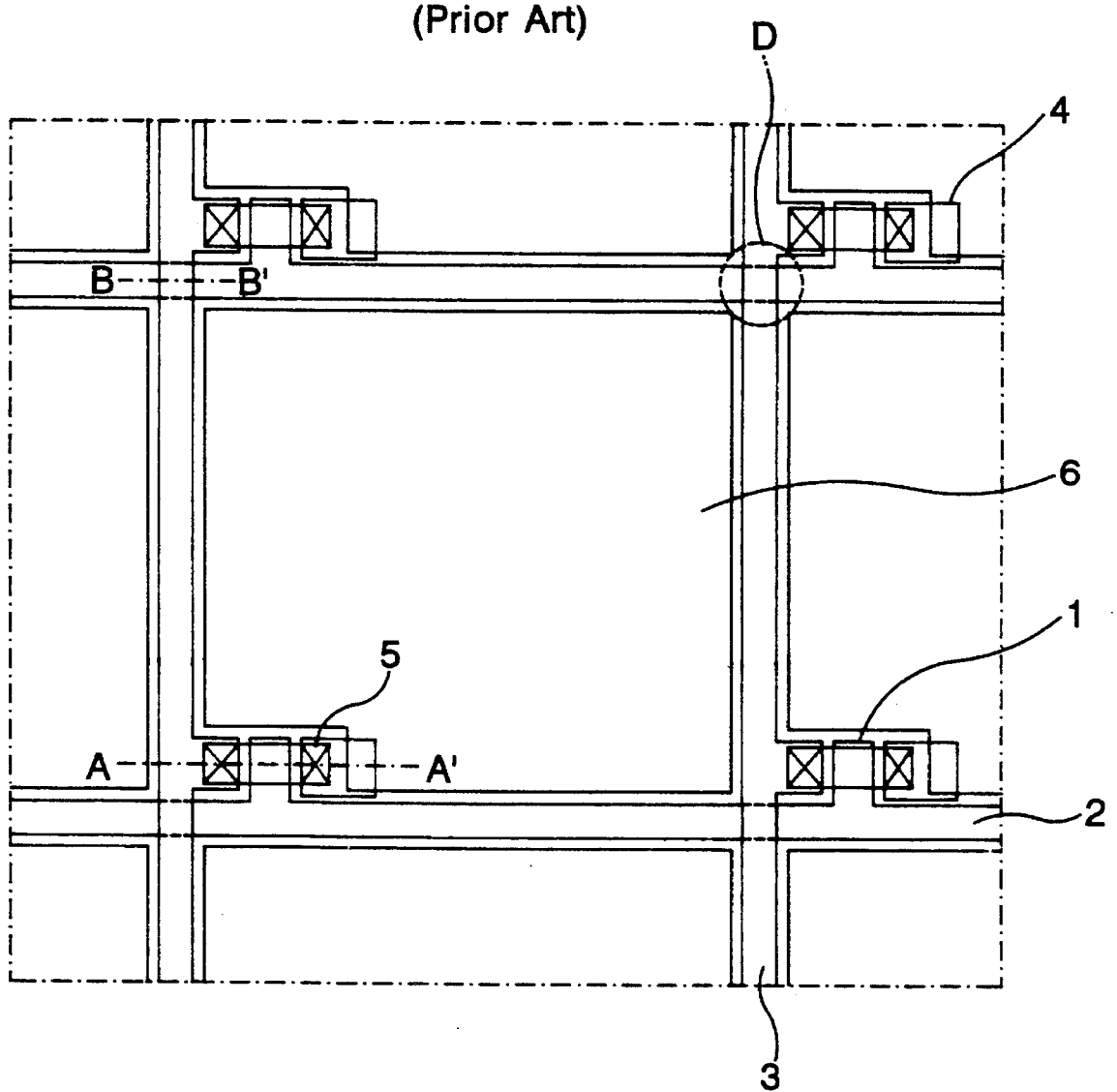
FIG. 1 shows a lay-out of a conventional liquid crystal display.
Figure 2:
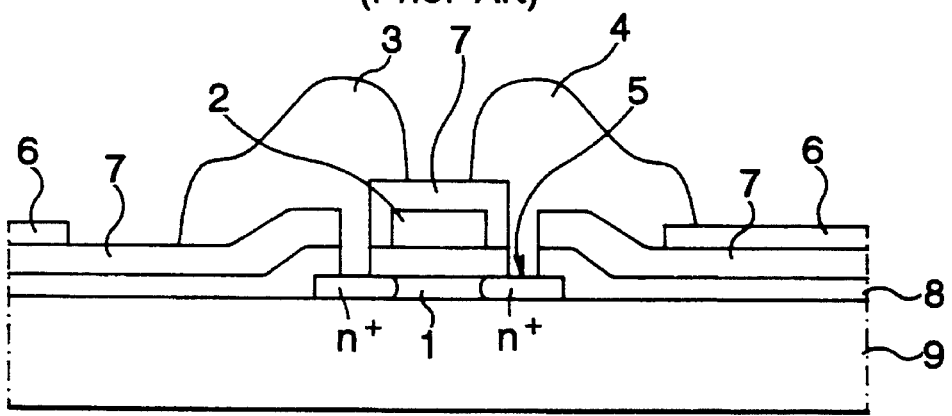
FIG. 2 is a sectional view of line A—A' of FIG. 1
Figure 3:
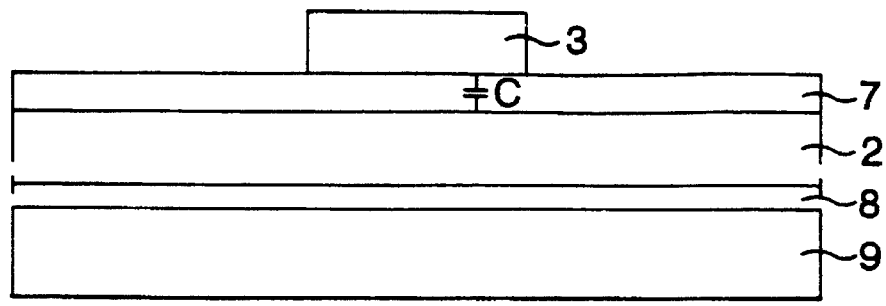
FIG. 3 is a sectional view of line B—B' of FIG. 1
Figure 5:
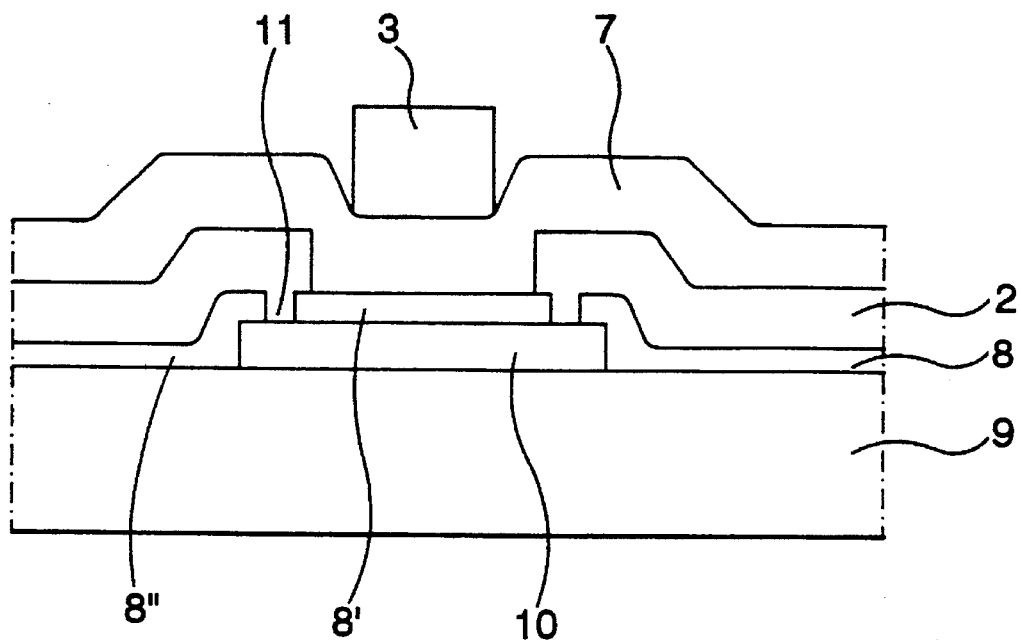
FIG. 5 is a sectional view of line C—C' of FIG. 4
Figure 6:
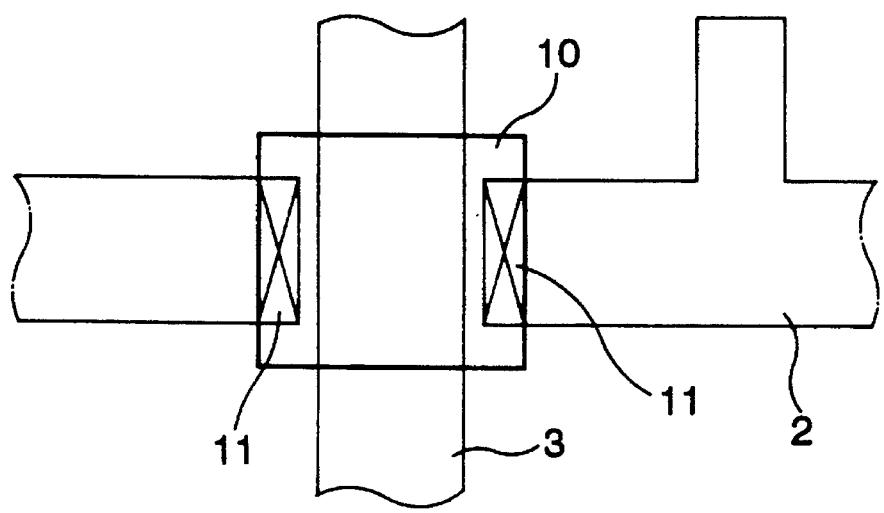
FIG. 6 is a enlarged view of part "E" of FIG. 4
Figure 7:
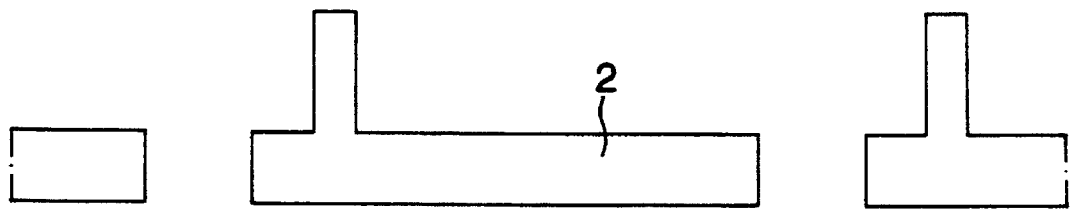
FIG. 7 shows a gate line according to this invention.

FIG. 4 is a plan view of the liquid crystal display according to this invention, FIG. 5 is a sectional view of C—C' line of FIG. 4, FIG. 6 is a enlarged view of part "E" of FIG. 4, FIG. 7 shows a gate line according to this invention, and FIGS. 8(a) to 8(f) and FIGS. 9(a) to 9(f) show sectional views of processes on C—C' line and D—D' line of FIG. 4, respectively, wherein the liquid crystal display according to this invention includes an insulating transparent substrate 9, a plurality of islandic conduction layers 10a formed at the crossing parts of gate lines and data lines on the insulating transparent substrate 9, a plurality of gate lines 2 formed to connect opposing edges in one direction of each conduction layer 10a, a plurality of data lines 3 crossing over the conduction layers 10a rectangular to the gate lines 2 isolated from the conduction layers 10a and the gate lines 2, a plurality of transparent poles 6 formed in pixel areas between the gate lines 2 and data lines 3 for application of voltage to the liquid crystal cells, and thin film transistors for application of data line signals to the transparent poles 6 in response to the signals of the gate lines 2 between each transparent poles 6 and each data lines 2. The gate electrodes 2' of the thin film transistors are connected to the gate lines 2, the source electrodes are connected to the data lines, and the drain electrodes are connected to the transparent poles.

The production method of the liquid crystal display according to this invention described above is to be explained hereinafter.

Figure 8A:
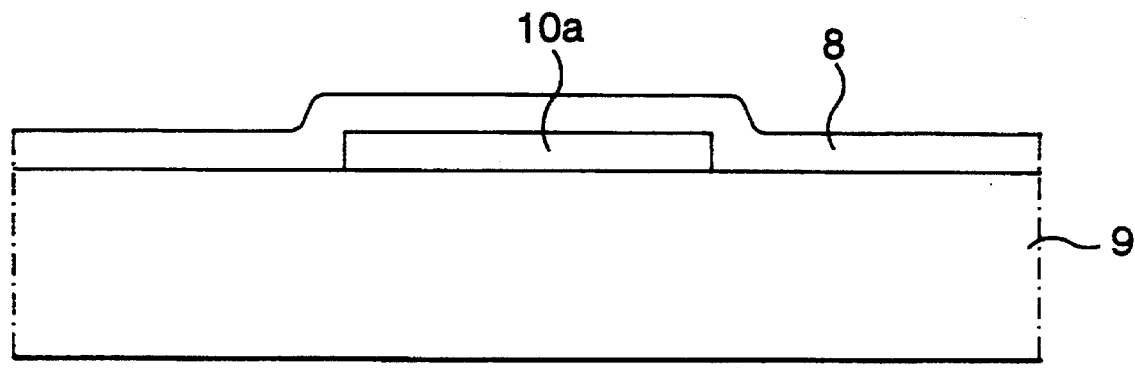
FIGS. 8(a) to 8(f) show sectional views of processes on C—C' line of FIG. 4
Figure 9A:
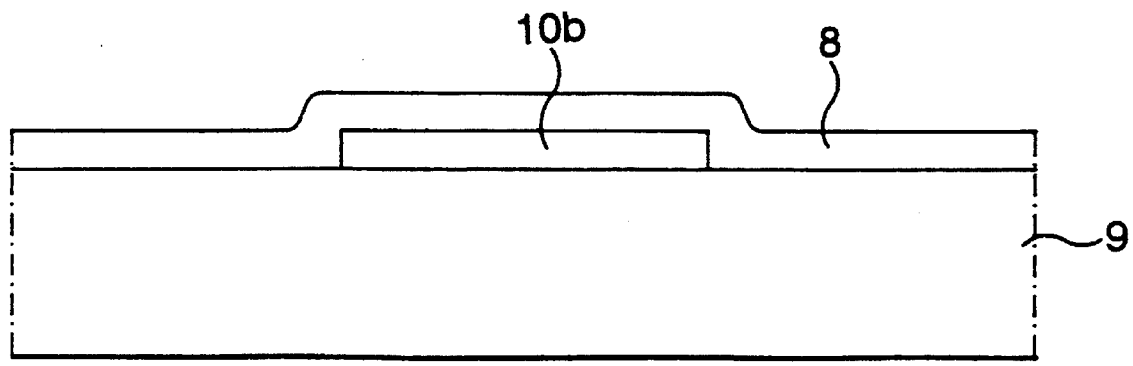
FIGS. 9(a) to 9(f) show sectional views of processes on D—D' line of FIG. 4.

As shown in FIG. 8(a) and FIG. 9(a), deposit undoped semiconductor layer on an insulating transparent substrate of glass or quartz, and carry out patterning, leaving the semiconductor layers only on the crossing parts of the gate lines 2 and data lines 3, which will be formed thereafter, and on the areas the thin film transistors to be formed by means of selective etching process using pattern mask so that rectangular islandic first semiconductor layers 10a and second semiconductor layers 10b are to be formed.

Figure 8B:
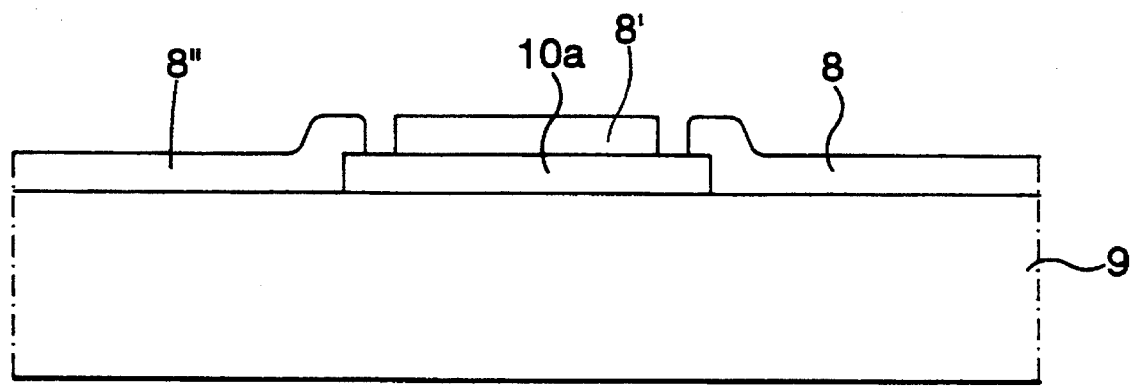

In this time, the width of the first semiconductor layers 10a at the crossing parts of the gate lines 2 and the data lines 3 are formed greater than the width of the data lines 3 and the gate lines 2 as shown in FIG. 6, Then, after overall deposition of first insulation film 8 for gate insulation, the first insulation film 8 is selectively removed on both sides of the first semiconductor layers 10a of the crossing parts of the gate lines and data lines as shown in FIG. 8(b) in the direction where the gate lines 2 to be formed so that contact holes 11 are formed exposing the first semiconductor layers 10a. The first insulation film thus forms sections 8, 8' and 8".

Figure 8C:
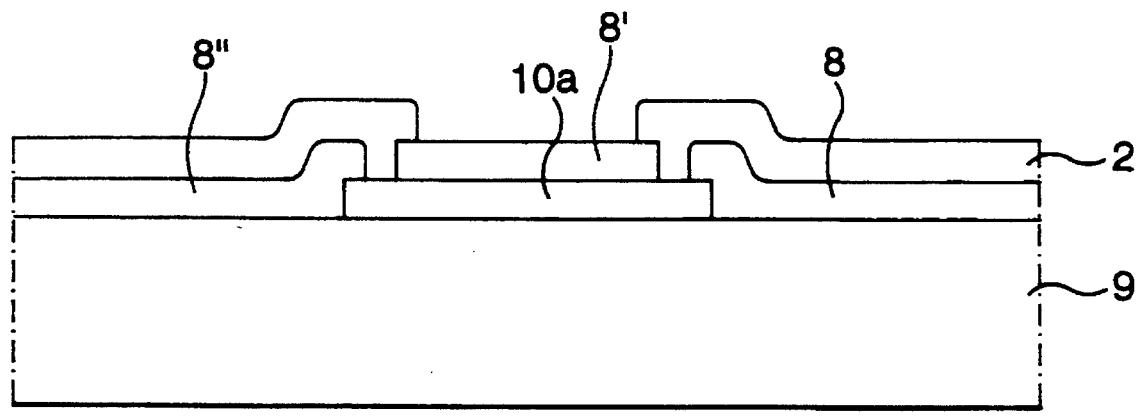
Figure 9B:
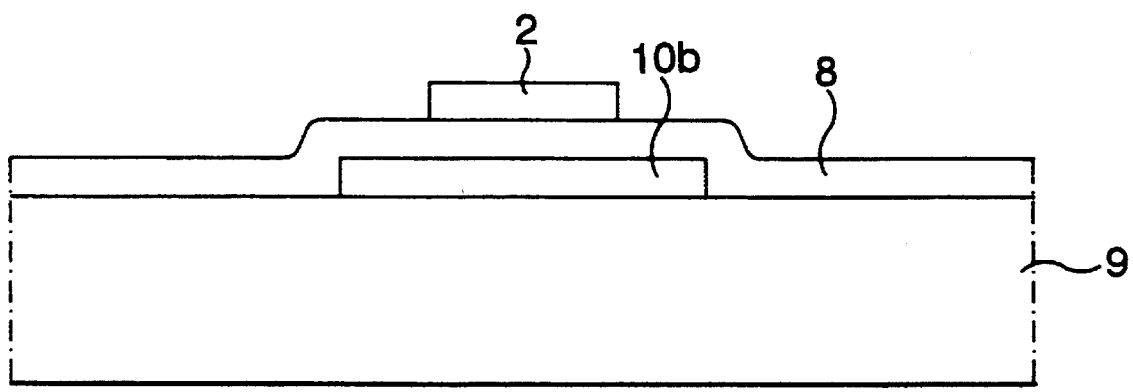

Thereafter, as shown in FIG. 8(c) and, after deposition of a metal layer, form the gate lines 2 in one direction between the first poly silicon layer 10a and the first poly silicon layer 10a' of the next pixel (not shown), as well as form; the gate electrodes 2' on the first insulation film 8 on the second poly silicon layer 10b, as shown in FIG. 9(b), so that the gate lines 2 and the gate electrodes 2' can be connected with the semiconductor layer 10b through the contact holes by means of selective etching process using photo sensitive film and pattern mask.

In this time, form the gate lines 2 to discontinue in the parts where the first semiconductor layers 10a have been formed so as not to have continuity but to continue through the first semiconductor layers 10a as shown in FIG. 7.

Figure 8D:
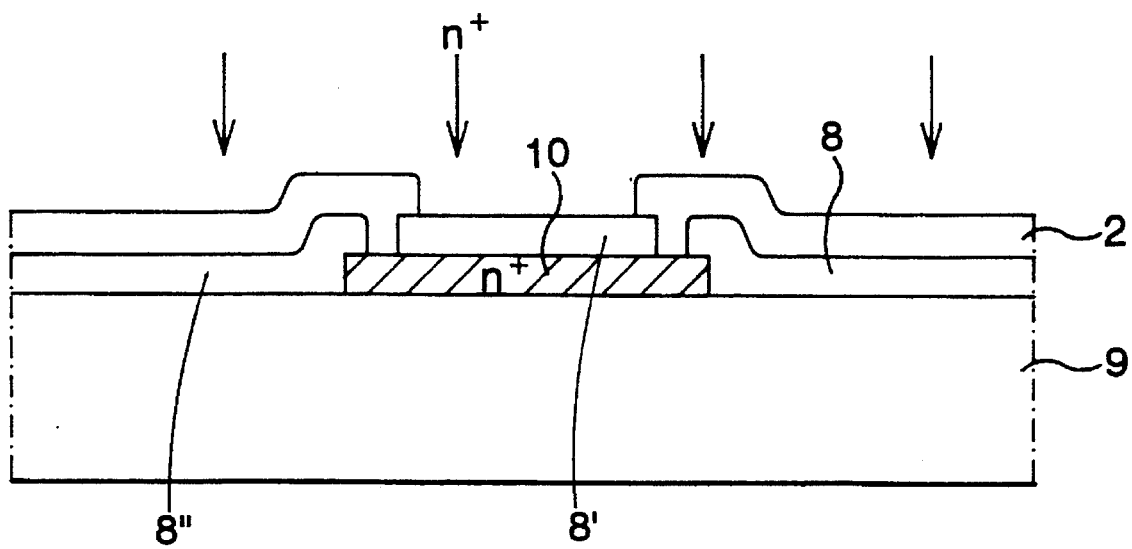
Figure 9C:
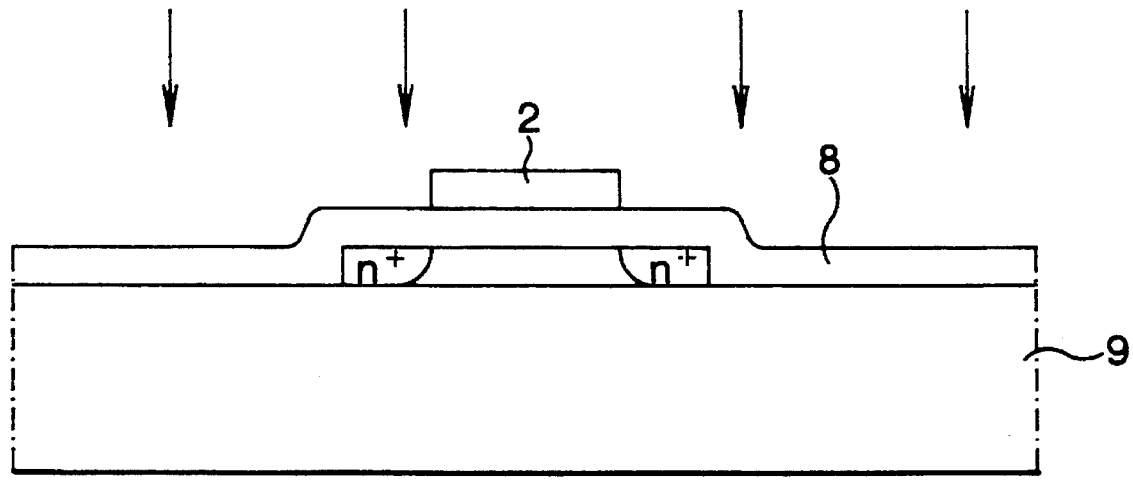

Then, as shown in FIG. 8(d) and FIG. 9(c), using the gate electrodes and the gate lines as masks, convert the first semiconductor layer 10a at the crossing parts of the gate lines and the data lines into conductive layer 10a and form source/drain areas only in the semiconductor layer 10b in the thin film transistor area, b injecting high density n+ions and heat treatment to the first poly silicon layer 10 at the crossing part of the gate lines and the data lines, and the second semiconductor layer 10b of the thin film transistor.

Due to this heat treatment, the dopant ion injected into the semiconductor layer causes activation and lateral diffusion, which in turn, causes the gate lines 2 to electrically contact with the conductive material islands 10.

Figure 8E:
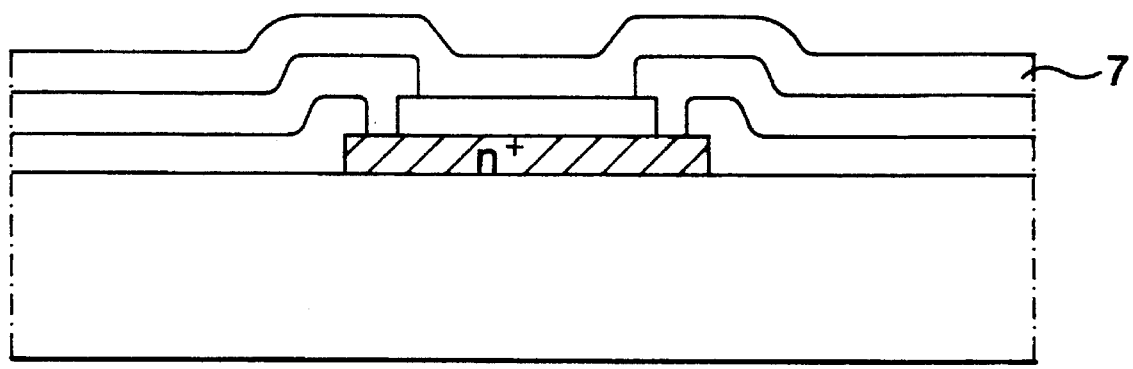
Figure 9D:
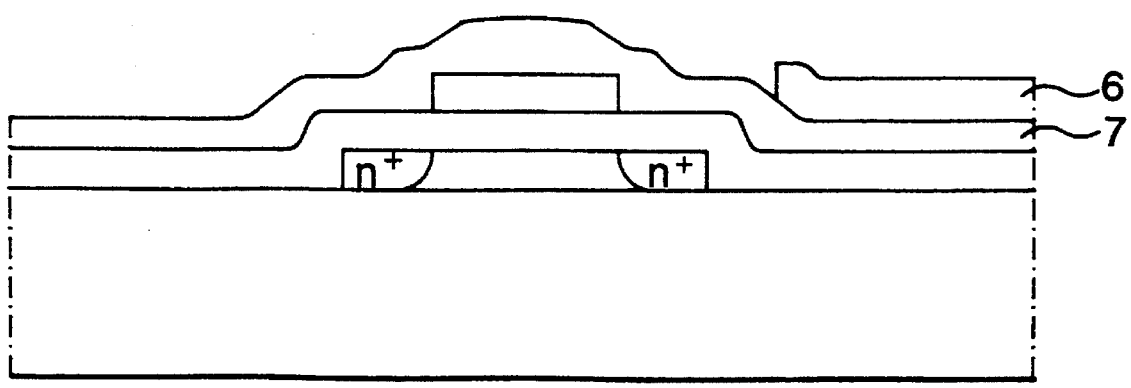
Figure 9E:
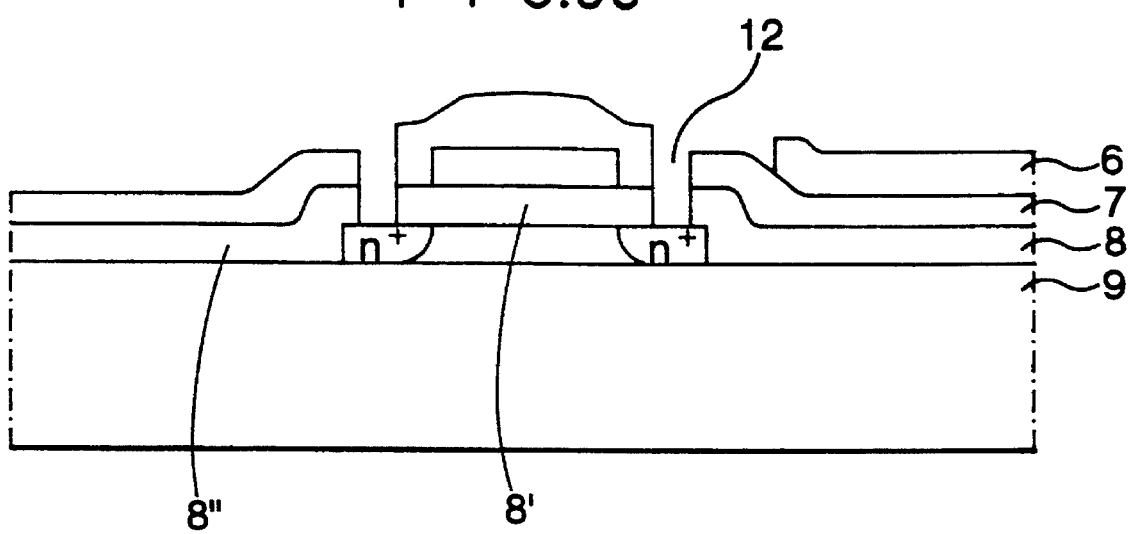

Then, as shown in FIG. 8(e) and FIG. 9(d), after forming insulation film 7 on overall surface and carrying out patterning of the transparent poles 6 in one side of the pixel area of the thin film transistors, form the entrance holes 12 so as to expose the source/drain area(n+) as shown in FIG. 9(e) by means of selective etching of the insulation film 7 in the source/drain area in the thin film transistor area.

Figure 8F:
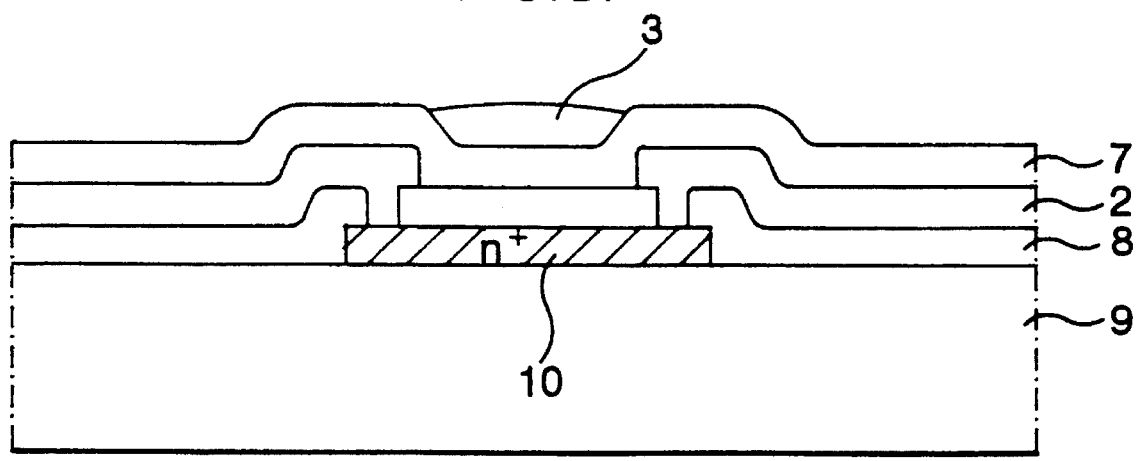
Figure 9F:
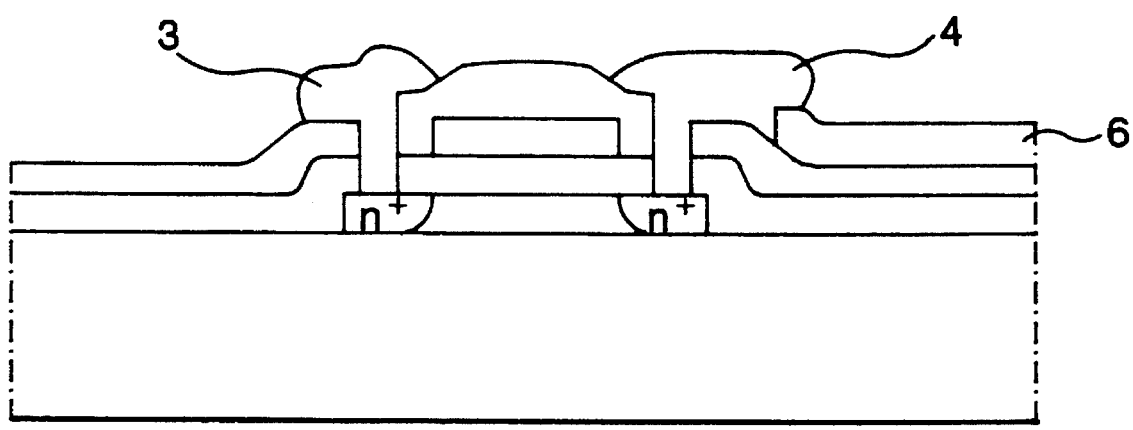

And, as shown in FIG. 8(f) and FIG. 9(f), after overall metal deposition carry out patterning by means of selective etching process using pattern mask so as to form the data lines 3 to cross over the conductive layer 10 rectangular to the gate lines 2 as well as to connect the transparent poles with the drain electrodes of the thin film transistors and the data lines 3 with the source area of the thin film transistor.

The liquid crystal display and the production method according to this invention described above has the advantage of providing high definition, large size liquid crystal display, for conductive layers are formed at the crossing parts of gate lines and data lines, the data lines are formed above the conductive layers isolating the conductive layers from the gate lines, and the gate lines are connected on both sides of the conductive layers so as to have continuity of the gate lines, which allows the decrease of the parasitic capacitance in the crossing parts of the gate lines and the data lines due to the distance between the two line at the crossing parts of the gate lines and the data lines being greater, to prevent the short circuits between the lines by pin holes due to the double construction of insulating film at the crossing parts, and better step coverage of the data lines due to the discontinuity of the gate lines at the crossing parts, whereby the gate signal delay time of the liquid crystal display is decreased resulting in high speed which can provide improved quality of images.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. An active matrix structure for a liquid crystal display comprising:

an insulating transparent substrate;

a plurality of transparent electrodes arranged in matrix form on the insulating transparent substrate;

a plurality of thin film transistors arranged in matrix form each having a first islandic semiconductor layer in the form of a doped semiconductor layer and a drain electrode connected to a respective one of the plurality of transparent electrodes, each of the plurality of thin film transistors also having a source electrode and a gate electrode;

a plurality of data lines connected to respective ones of the source electrodes in columns of the matrix; and a plurality of gate lines connected to respective ones of the gate electrodes in rows of the matrix, wherein the gate lines are cut where the gate lines cross the data lines and the gate lines are connected where they are cut by a second conductive islandic semiconductor layer in the form of a doped semiconductor layer.

2. A method for fabricating a liquid crystal display comprising the processes of:

forming a plurality of islandic first semiconductor layers and second semiconductor layers at areas where gate lines and data lines are to be crossed, and thin film transistors are to be formed on a transparent substrate;

forming contact holes on a first insulation film, to expose both sides of each first semiconductor layers after the first insulation film is deposited on overall surface;

forming a plurality of the gate lines integrated with gate poles so as to connect between each first semiconductor layers in one direction through the contact holes and to form the gate poles on the second semiconductor layers;

converting the first semiconductor layers into conductive layers by performing an ion implantation of high density n+ion using the gate poles and the gate lines as a mask, and a heat treatment and forming source and drain regions in the second semiconductor layers;

forming transparent poles in pixel areas after forming a second insulation film on overall surface;

forming a plurality of data lines to cross above the conductive layers rectangularly to the gate lines; and forming contact holes in the source and drain region and forming metal so as to connect the source region with the data lines, and the drain region with the transparent poles.

* * * * *